(12) United States Patent
Sakai et al.

(10) Patent No.: US 7,584,037 B2
(45) Date of Patent: Sep. 1, 2009

(54) OCCUPANT DETERMINING DEVICE

(75) Inventors: Morio Sakai, Toyota (JP); Masaki Mori, Kariya (JP); Minoru Izawa, Okazaki (JP); Yasunori Hasegawa, Kasugai (JP); Daisuke Itoh, Kasugai (JP); Norihiko Nagae, Seto (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 1023 days.

(21) Appl. No.: 10/620,594

(22) Filed: Jul. 17, 2003

(65) Prior Publication Data

US 2004/0068356 A1    Apr. 8, 2004

(30) Foreign Application Priority Data

Jul. 17, 2002   (JP)   ............................. 2002-208595

(51) Int. Cl.
*G05D 3/00*   (2006.01)
(52) U.S. Cl. ....................................... 701/45
(58) Field of Classification Search ................... 701/45
See application file for complete search history.

(56) References Cited

U.S. PATENT DOCUMENTS 6,012,007 A *  1/2000  Fortune et al. ................. 701/45
6,356,200 B1 *  3/2002  Hamada et al. ............. 340/667
6,957,591 B2 * 10/2005  Takafuji et al. ........ 73/862.391

FOREIGN PATENT DOCUMENTS

JP           9-207638 A      8/1997

* cited by examiner

*Primary Examiner*—Kim T Nguyen
(74) *Attorney, Agent, or Firm*—Buchanan Ingersoll & Rooney PC

(57) ABSTRACT

An occupant determining device includes a load detecting sensor provided on a seat body and a controller. The controller calculates a detected load value based on an output value of the load detecting sensor and performs occupant determination based on the detected load value. The occupant determination state is switched to an adult determination state when a certain delaying time elapses after the detected load value exceeds a determination threshold. The controller sets plural determination thresholds, and the larger each determination threshold being exceeded by the detected load value is, the shorter the delaying time is set.

3 Claims, 4 Drawing Sheets

OCCUPANT DETERMINING DEVICE

CROSS REFERENCE TO RELATED APPLICATIONS

The application is based on and claims priority under 35 U.S.C. §119 with respect to a Japanese Patent Application 2002-208595, filed on Jul. 17, 2002, the entire content of which is incorporated herein by reference.

FIELD OF THE INVENTION

This Invention generally relates to an occupant determining device. More particularly, this invention pertains to an occupant determining device which performs occupant determination based on a load detection value detected by a load detecting sensor provided at a seat.

BACKGROUND OF THE INVENTION

Generally, when an air bag device, which is one of a safety device, is provided in a vehicle for ensuring an occupant sitting on a seat from a traffic accident, an occupant determining device is provided at the seat in order to determine whether or not an occupant sitting on the seat exists, or whether an occupant sitting on the seat is, for example, an adult or the occupant is a child. For example, a known occupant determining device is disclosed in a Japanese Patent Laid-open Publication No.9 (1997)-207638. This occupant determining device has plural load detecting sensors and a controller. The plural load detecting sensors are respectively provided on mounting portions for mounting a seat to a vehicle floor. The controller calculates a load detection value based on detected values of each load detecting sensor and then determines whether or not an occupant sitting on the seat exists. More specifically, the controller initially calculates the load detection value by summing the detected values from each load detecting sensor by an adder, and then a determination transaction circuit being provided in the controller compares the load detection value with a predetermined threshold (a determination threshold). The controller determines whether or not the occupant sitting on the seat exists based on the foregoing compared result.

In the occupant determining, device described above, load being applied to the load detecting sensor varies due to swinging or posture variation of the occupant sitting on the seat under a traveling vehicle. Thus, in order to prevent frequent switching of an occupant determination state by temporary load variation, a low-pass filter is applied to signals transmitted from the load detecting sensors, or delaying transaction is applied at the switching of the occupant determination state by a magnitude relation between the load detection value and the determination threshold. Then the temporary switching of the occupant determination state (for example, from a state corresponding to "adult" to a state corresponding to "child"), which is generated by the swinging or the posture variation of the occupant, is prevented.

However, concerning the foregoing occupant determining device, when the delaying transaction is applied to the switching of the occupant determination state, for example even if the posture of the occupant is normalized after the occupant determination state Is switched from an actual state corresponding to an occupant actually sitting on the seat to an incorrect state being different from the actual state, the incorrect state continues for a while under the influence of the delaying transaction. That is, returning to the actual state Is delayed. Similarly, when a type of the occupant sitting on the seat is switched from the "child" to the "adult", the state corresponding to the "child" cannot be immediately switched to the "adult".

The present invention therefore seeks to provide an occupant determining device capable of determining immediately and accurately that an occupant sitting on a seat corresponds to "adult" in response to load applied to the seat.

SUMMARY OF THE INVENTION

According to an aspect of the present invention, an occupant determining device includes a load detecting sensor provided on a seat body and a controller. The controller calculates a detected load value based on an output value of the load detecting sensor and performs occupant determination based on the detected load value. The occupant determination state is switched to an adult determination state when a certain delaying time elapses after the detected load value exceeds a determination threshold. The controller sets plural determination thresholds, and the larger each determination threshold being exceeded by the detected load value is, the shorter the delaying time is set.

According to another aspect of the present invention, the controller sets a first determination threshold and a second determination threshold being larger than the first determination threshold. Further, the controller sets first delaying time corresponding to the first determination threshold and a second delaying time corresponding to the second determination threshold. The second delaying time is shorter than the first delaying time.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Hereinafter, an embodiment of the present invention applied to a vehicle seat is described in sequence with reference to FIGS. 1-6.

Figure 1:
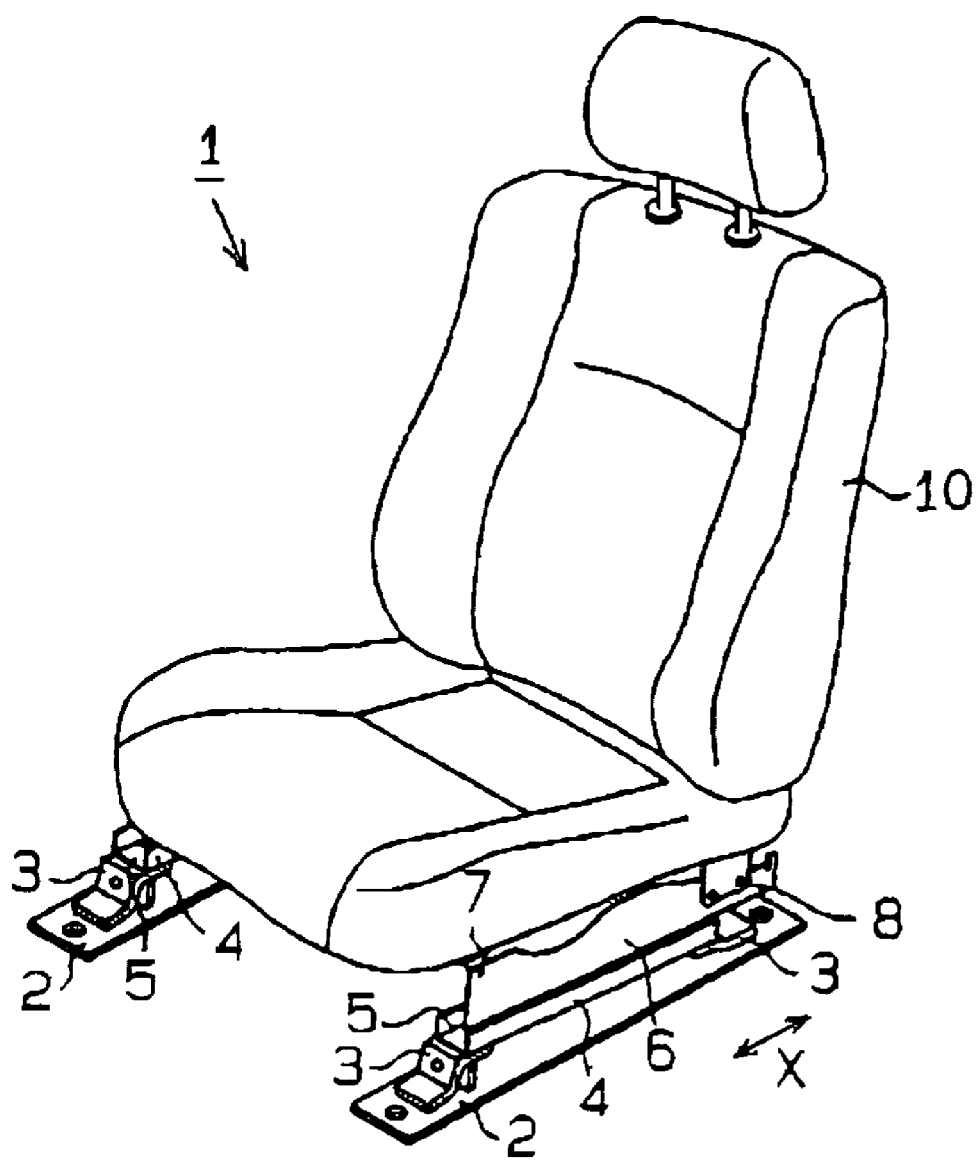
FIG. 1 is perspective view of a seat according to an embodiment of the present invention.

As shown in FIG. 1, a seat body 1 according to an embodiment of the present Invention is provided, for example, as a passenger seat of a vehicle. A pair of supporting frames 2 is fixed to a vehicle floor (not shown) so as to extend in a longitudinal direction of the vehicle ("X" arrow shown in FIG. 1). The seat body 1 is mounted on the vehicle floor through the pair of supporting frames 2.

A pair of brackets 3 is fixed to each supporting frame 2 on front and rear portions thereof, and a lower rail 4 is fixed to the pair of the brackets 3 along the supporting frame 2. The lower rail 4 has an approximately U-shaped cross section with an upward opening. The opening extending in the longitudinal direction of the vehicle forms a slide groove 5.

Figure 2:
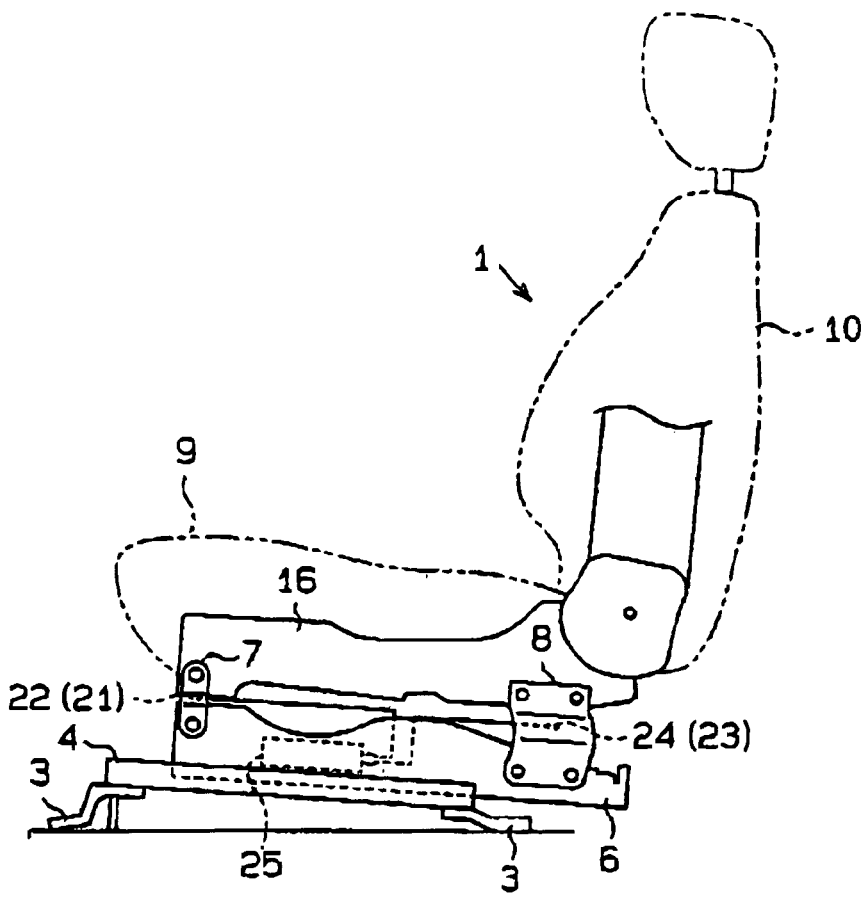
FIG. 2 is a lateral view of the seat shown in FIG. 1.

A pair of upper rails 6 is accommodated in the slide grooves 5 of the lower rails 4 so as to be slidably movable in the longitudinal direction of the vehicle in the slide grooves 5. As shown in FIG. 2, each upper rail 6 has a front sensor bracket 7 and a rear sensor bracket 8. A pair of lower arms 16, which supports a seat cushion 9 and a seat back 10, is connected to the pair of upper rails 6 by using the front sensor brackets 7 and the rear sensor brackets 8.

Figure 3A:
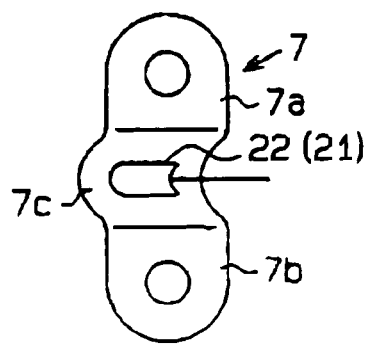
FIG. 3(a) is a perspective view of a front sensor bracket provided on lateral sides of the seat shown in FIG. 1.

As shown in FIG. 3(a), each front sensor bracket 7 is provided with an upper fastening portion 7a and a lower fastening portion 7b. Further, a flexible portion 7c, which has a curved shape and located between the upper fastening portion 7a and the lower fastening portion 7b, is provided on the front sensor bracket 7. The upper fastening portion 7a and the lower fastening portion 7b are respectively fixed to a front side of the lower arm 16 and a front side of the upper rail 6. The flexible portion 7c of each front sensor bracket 7 is provided with a load detecting sensor, that is a front right-hand side sensor 21 (a load detecting means, hereinafter referred to as a load detecting sensor 21) and a front left-hand side sensor 22 (a load detecting means, hereinafter referred to as a load detecting sensor 22). These load detecting sensors 21 and 22 include for example, a strain detecting element such as a strain gauge. Thus, the load detecting sensors 21 and 22 can detect a flexible amount of the flexible portion 7c in response to load applied to the seat cushion 9.

Figure 3B:
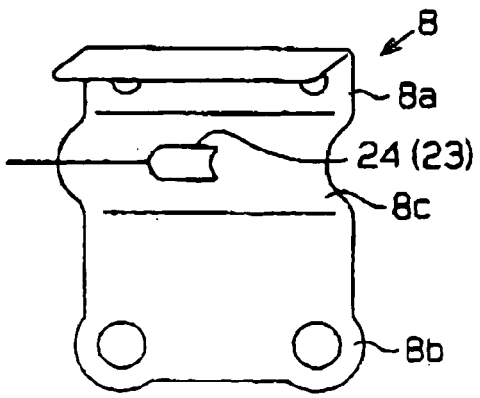
FIG. 3(b) is a perspective view of a rear sensor bracket provided on lateral sides of the seat shown in FIG. 1.

On one hand, as shown in FIG. 3(b), each rear sensor bracket 8 is also provided with an upper fastening portion 8a and a lower fastening portion 8b as same with the front sensor bracket 7. A flexible portion 8c, which has a curved shape and located between the upper fastening portion 8a and the lower fastening portion 8b, is provided on the rear sensor bracket 8. The upper fastening portion 8a and the lower fastening portion 8b are respectively fixed to a rear side of the lower arm 16 and a rear side of the upper rail 6. The flexible portion 8c of each rear sensor bracket 8 is provided with a load detecting sensor, that is a rear right-hand side sensor 23 (a load detecting means, hereinafter referred to as a load detecting sensor 23) and a rear left-hand side sensor 24 (a load detecting means, hereinafter referred to as a load detecting sensor 24). These load detecting sensors 23 and 24 include the strain detecting element such as the strain, gauge as same with the load detecting sensors 21 and 22. The load detecting sensors 23 and 24 can detect a flexible amount of the flexible portion 8c in response to load applied to the seat cushion 9.

Figure 4:
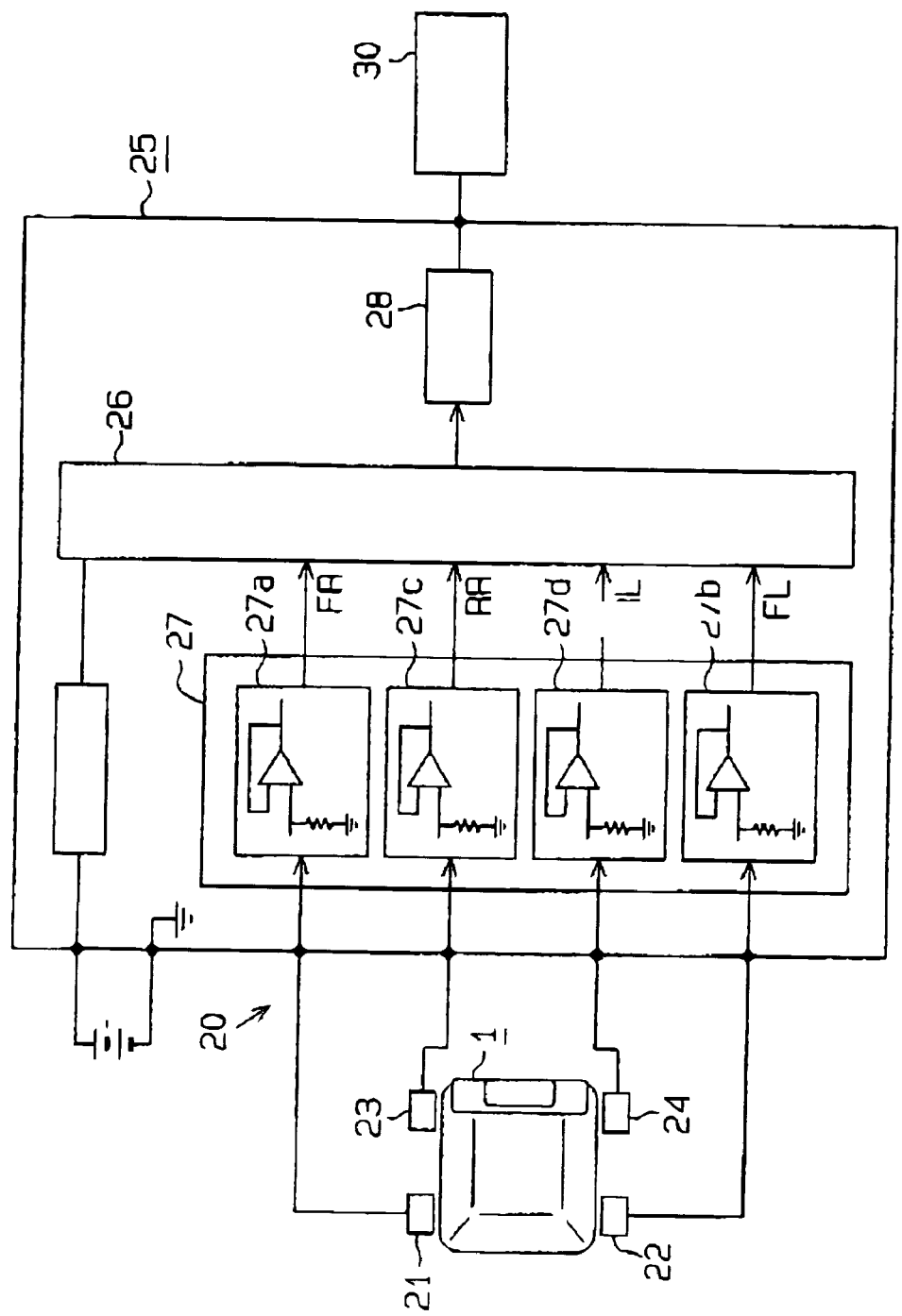
FIG. 4 is a block diagram showing an electric structure of an occupant determining device according to the embodiment of the present invention.

FIG. 4 is a block diagram showing an electric structure of an occupant determining device 20 provided at the seat body 1. The occupant determining device 20 includes the load detecting sensors 21-24 and a controller 25.

The controller 25 has CPU 26, a sensor signal Input circuit 27, and an output circuit 28 therein. The sensor signal input circuit 27 has active filters 27a, 27b, 27c, and 27d corresponding to the load detecting sensors 21-24 respectively. Load signals detected by the load detecting sensors 21-24 are inputted to the CPU 26 through the active filters 27a-27d. The active filters 27a-27d, which includes passive elements such as condensers and resistances combined with active elements such as an amplifier, are well-known low-pass filters. Among the load signals detected, by the load detecting sensors 21-24, only the load signals with lower frequency can pass through the active filters 27a-27d, and residual load signals are cut off.

Based on the load signals from the load detecting sensors 21 and 22 passing through the active filters 27a and 27b respectively, an output value FR of the load detecting sensor 21 and an output value FL of the load detecting sensor 22 are calculated by the CPU 26. Correspondingly, an output value RR of the load detecting sensor 23 and an output value RL of the load detecting sensor 24 are calculated by the CPU 26 based on the load signals from the load detecting sensors 23 and 24 passing through the active filters 27c and 27d respectively. A load detection value (a detected load value) Ws is calculated by the sum of the output values FR, FL, RR, and RL.

The CPU 26 performs a series of calculation based on a predetermined control program and an initial data memorized therein. Then the CPU 26 outputs a calculation result or an occupant determination result to the output circuit 28. The calculation result is inputted to an air bag controller 30 through the output circuit 28, then operation of an air bag device or for example, an inflating amount of the air bag is controlled.

Next, transaction of occupant determination in the embodiment will be explained below with reference to time charts shown in FIG. 5 and FIG. 6. The CPU 26 determines a type of the occupant ("adult", "child" or "no occupant") based on the load detection value Ws. In the process of the occupant determination, the CPU 26 performs clocking for delaying transaction at switching of an occupant determination state by a built-in timer.

Figure 5:
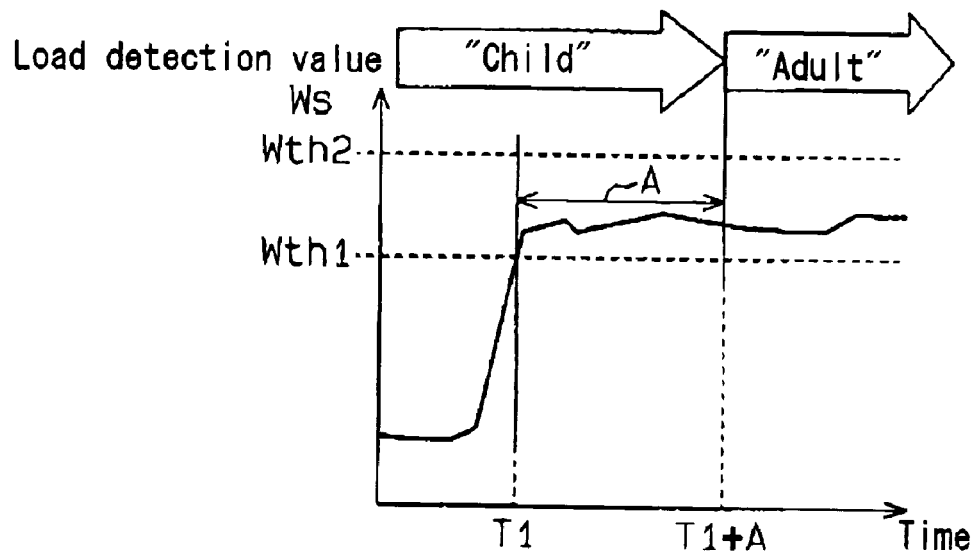
FIG. 5 is a time chart describing occupant determination performed in the embodiment of the present invention.
Figure 6:
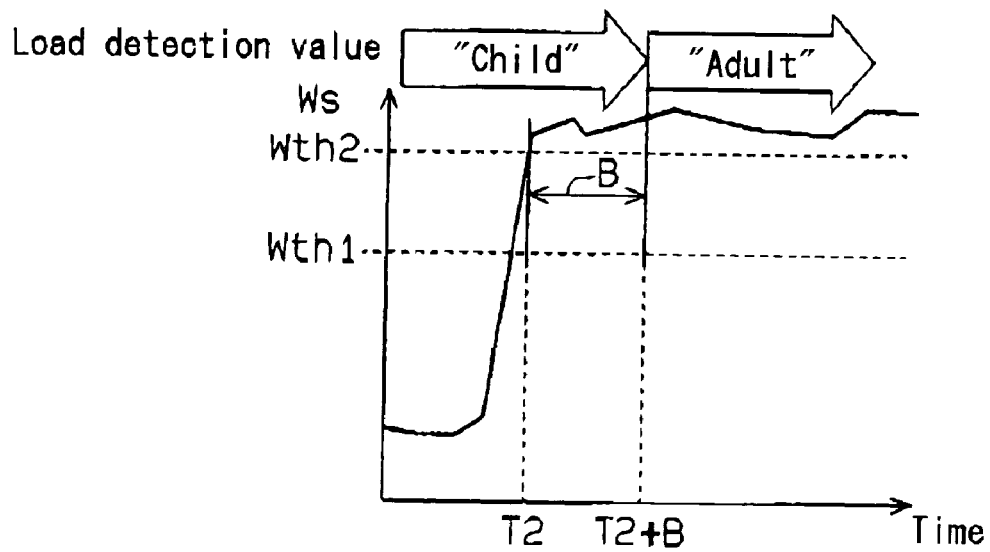
FIG. 6 is another time chart describing the occupant determination performed in the embodiment of the present invention.

In FIG. 5 and FIG. 6, a first determination threshold Wth1 and a second determination threshold Wth2 are predetermined thresholds being set in order to determine the occupant determination state corresponding to the "adult" (an adult determination state). The second determination threshold Wth2 is set larger than the first determination threshold Wth1. The first determination threshold Wth1 is set suitable for determining the "adult" by being compared with the load detection value Ws. The second determination threshold Wth2 is set suitable for reliably determining the "adult" by being compared with the load detection value Ws. In other words, the second determination threshold Wth2 is set so that the occupant determination state corresponding to the "adult" can be reliably determined by determining the "adult" under a more specific condition. Hereinafter, transition of the occupant determination will be explained as the occupant determination state corresponds to the "child" (a child determination state) under the load detection value Ws being smaller than the first determination threshold Wth1. This "child" state is generated when the occupant determination state corresponding to the "child" is fixed after the load detection value Ws decreases by posture variation of the occupant. Of course, when the occupant determination state corresponds to the "no occupant" under the load detection value Ws being sufficiently small, transition of the occupant determination under the "no occupant" state is similar to the transition under the "child" state. Therefore, explanation concerning the "no occupant" state is omitted.

In FIG. 5, when the load detection value Ws exceeds the first determination threshold Wth1 at time "T1", the CPU 26 starts clocking of elapsing time under the load detection value Ws being the first determination threshold Wth1 or more and smaller than the second determination threshold Wth2. When the elapsing time exceeds a first predetermined time A as a first delaying time (a certain delaying time), the CPU 26 switches the occupant determination state from the "child" to the "adult". The first predetermined time A is applied to delaying transaction corresponding to the first determination threshold Wth1. The first predetermined time A is set to be relatively long time in order to prevent temporary switching of the occupant determination state from the "child" to the "adult" by swinging or posture variation of the occupant. Then the occupant determination state being the "adult" continues after elapsing of the first predetermined time A from the time "T1".

On one hand, in FIG. 6, when the load detection value Ws exceeds the second determination threshold Wth2 at time "T2", the CPU 26 starts clocking of elapsing time under the load detection value Ws being the second determination threshold Wth2 or more. When the elapsing time exceeds a second predetermined time B as a second delaying time (a certain delaying time), the CPU 26 switches the occupant determination state from the "child" to the "adult". The second predetermined time B is applied to delaying transaction corresponding to the second determination threshold Wth2. The second predetermined time B is set to be a value which can prevent the temporary switching of the occupant determination state from the "child" to the "adult" by the swinging or the posture variation of the occupant as same with the first predetermined time A. In case of the delaying transaction corresponding to the second determination threshold Wth2, since the load detection value Ws exceeds the second determination threshold Wth2 being a specific value for determining the "adult", a result of the occupant determination on the second determination threshold Wth2 is more reliable than the occupant determination on the first determination threshold Wth1. Consequently, the second predetermined time B is set shorter than the first predetermined time A. Then the occupant determination state being the "adult" continues after elapsing of the second predetermined time B from the time "T2".

As explained above, according to the embodiment of the present invention, the larger the determination threshold exceeded by the load detection value Ws is, the shorter the delaying time is set. Thus, with regard to an occupant more reliably corresponding to the "adult" such as an occupant weighing heavy, since the determination threshold exceeded by the load detection value Ws is large, the occupant can be immediately determined as the "adult" in the shorter delaying time.

Consequently, even if the occupant determination state is switched to the "child" being different from an actual state (the "adult") due to the posture variation of the occupant, the occupant determination state being the "child" can immediately return to the "adult" by normalizing the posture of the occupant in case of the occupant weighing heavy.

Further, even if the occupant being the "child" is switched to the "adult", the occupant determination state can be immediately switched to the "adult" as same with the foregoing case in case of the occupant weighing heavy. Alternatively, when the occupant being the "adult" newly gets on board, the occupant determination state can be immediately switched to the actual "adult" state from the "no occupant" state in case of the occupant weighing heavy.

In the embodiment, the two determination thresholds are provided, and the delaying time corresponding to each determination threshold is provided. Thus, when the occupant is determined as the "adult" in response to the weight of the occupant, calculation load for determining can be reduced.

Further, in the embodiment, with regard to an occupant uncertainly corresponding to the "adult" such as an occupant weighing light, since the delaying time is set longer, frequent switching of the occupant determination state by the temporary load variation can be prevented.

Of course, an embodiment of the present invention does not limited to the above-described embodiment.

According to the above-described embodiment, as shown in FIG. 5, the occupant determination state is switched to the "adult" based on the elapsing time under the load detection value Ws which is the first determination threshold Wth1 or more and smaller than the second determination threshold Wth2. Alternatively, without reference to the second determination threshold Wth2, the occupant determination state may be switched to the "adult" based on elapsing time under the load detection value Ws being the first determination threshold Wth1 or more. In this case, if the load detection value Ws exceeds the second determination threshold Wth2, clocking of elapsing time which corresponds to the second determination threshold Wth2 is performed together with the elapsing time corresponding to the first determination threshold Wth1. When either elapsing time reaches the delaying time corresponding to each elapsing time, the occupant determination state is switched to the "adult".

In the embodiment, the two determination thresholds compared with the load detection value Ws and the delaying time corresponding to each determination threshold are provided. In this case, extra-three determination thresholds and delaying time corresponding to extra-three determination thresholds may be provided. That is, the larger the determination threshold exceeded by the load detection value Ws is, the shorter the delaying time may be set.

In the embodiment, pair of the load detecting sensors 21 and 22 is provided at front portions of the seat body 1, and pair of the load detecting sensors 23 and 24 is provided at rear portions of the seat body 1. However, the foregoing number of the sensors and position of each sensor are one of the examples. Therefore, single load detecting sensor may be provided at a predetermined position of the seat body 1 or plural load detecting sensors may be provided at predetermined positions of the seat body 1 so that the occupant sitting on the seat body 1 can be determined based on a load detection value calculated by a detected value of the single load detecting sensor or plural detected values of the plural load detecting sensors.

The shape of sensor brackets 7 and 8 according to the embodiment is one of the examples. Any shape may be applied to the brackets 7 and 8 as far as flexure is generated on the brackets 7 and 8 in response to a sitting load.

The mounting position of the load detecting sensors 21-24 are one of the examples. Any position can be arbitrary as far as the sitting load can be detected.

The seat body 1 according to the embodiment is applied as the passenger seat. However, the seat body 1 may be applied as a driver seat.

In the embodiment, explanation of the delaying time is provided as the occupant determination state is switched from the "child" to the "adult" by the load detection value Ws exceeding the determination threshold. Correspondingly, delaying time may be set as the occupant determination state is switched from the "adult" to the "child". That is, when the load detection value Ws having been exceeding the determination threshold becomes smaller than the determination threshold, or when magnitude relation between the load detection value Ws and the determination threshold is switched, plural determination thresholds may be provided, and the smaller the determination thresholds is, the shorter the delaying time may be set. For example, when the occupant being the "child" carries a pack temporarily, the load detection value Ws exceeds the determination threshold. In this case, when the occupant releases the pack, the occupant determination state can be immediately switched from the different "adult" state to the actual "child" state. Additionally, when the occupant being the "adult" is switched to the "child", the occupant determination state immediately becomes the actual "child" state if the occupant weighs sufficiently light.

The principles, preferred embodiments and mode of operation of the present Invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. An occupant determining device, comprising:
a load detecting sensor provided on a seat body; and
a controller calculating a detected load value based on an output value of the load detecting sensor and performing occupant determination based on the detected load value,
wherein the controller sets a first determination threshold and a second determination threshold larger than the first determination threshold,
wherein if the detected load value falls between the first and second determination thresholds and continues for a first time duration, the controller switches an occupant determination state to an adult determination state, and
wherein if the detected load value exceeds the second determination threshold and continues for a second time duration which is shorter than the first time duration, the controller switches the occupant determination state to the adult determination state.

2. An occupant determining device, comprising:
a load detecting sensor provided at a seat; and
a controller calculating a detected load value based on an output value of the load detecting sensor and performing occupant determination based on the detected load value,
wherein the controller sets a first determination threshold and a second determination threshold larger than the first determination threshold,
wherein if the detected load value falls between the first and second determination thresholds and continues for a first time duration, the controller switches an occupant determination state to an adult determination state from a child determination state, and
wherein if the detected load value exceeds the second determination threshold and continues for a second time duration which is shorter than the first time duration, the controller switches the occupant determination state to the adult determination state from the child determination state.

3. An occupant determining device, comprising:
a load detecting sensor provided on a seat body to detect a load applied by an occupant to a seat;
a controller which calculates a detected load value based on an output value of the load detecting sensor and performs occupant setting in which an occupant determination state is set based on the detected load value detected by the load detecting sensor;
the controller changing the occupant determination state to the adult determination state when the detected load value is between a first determination threshold and a second determination threshold for a first time duration, the second determination threshold being larger than the first determination threshold;
the controller changing the occupant determination state to the adult determination state when the detected load value exceeds the second determination threshold for a second time duration; and
the controller changing the occupant determination state to the adult determination state sooner when the detected load value exceeds the second determination threshold for the second time duration than when the detected load value is between the first and second determination thresholds for the first time duration.

* * * * *